G. W. HARPER.
CRANK SHAFT.
APPLICATION FILED AUG. 17, 1914.
1,368,627.
Patented Feb. 15, 1921.
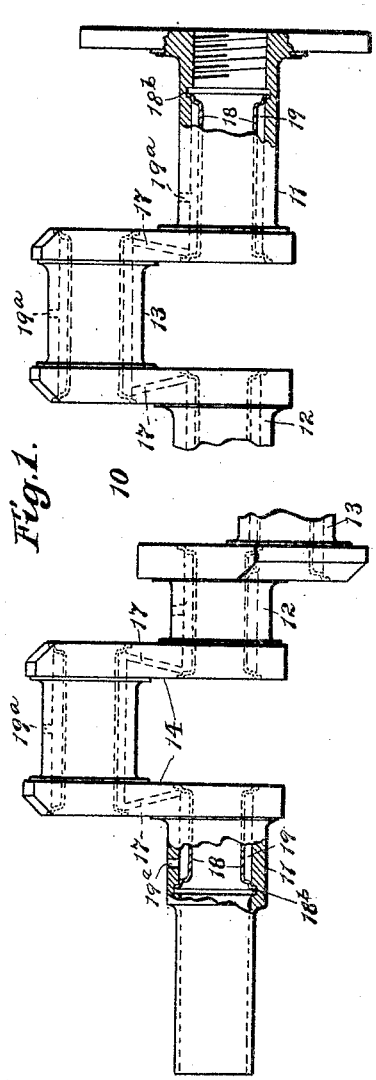
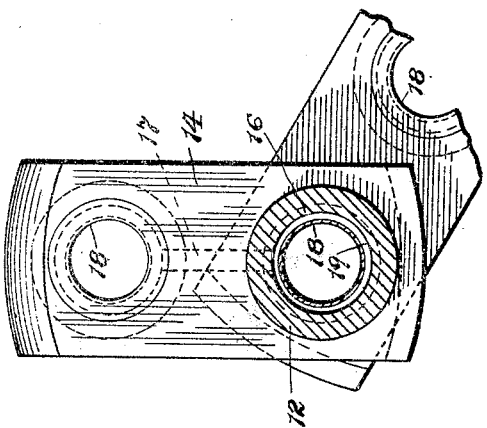
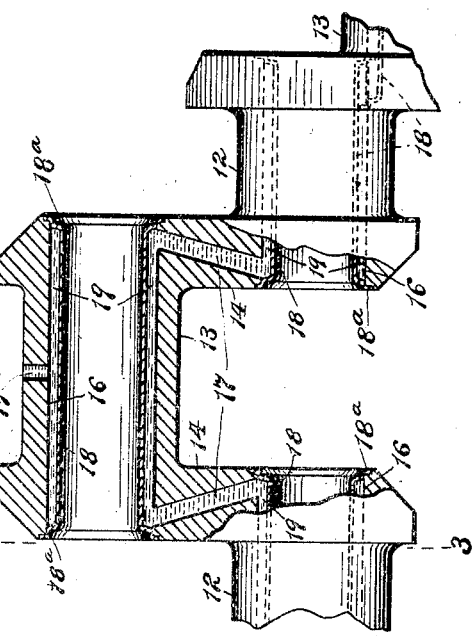
Witnesses.
S. W. Brainard.
W. H. Percy.
Inventor.
George W. Harper
By Thurston & Kwis
Attorneys.

UNITED STATES PATENT OFFICE.

GEORGE W. HARPER, OF CLEVELAND, OHIO.

CRANK-SHAFT.

1,368,627. Specification of Letters Patent. Patented Feb. 15, 1921.

Application filed August 17, 1914. Serial No. 857,102.

*To all whom it may concern:*

Be it known that I, GEORGE W. HARPER, a citizen of the United States, residing at Cleveland, in the county of Cuyahoga and State of Ohio, have invented a certain new and useful Improvement in Crank-Shafts, of which the following is a full, clear, and exact description.

This invention relates to improvements in crankshafts, and especially the crankshafts of internal combustion engines.

It is customary with certain types of engine lubricating systems, especially what is known as the forced feed system, to provide a passageway from substantially one end of the crankshaft to the other, and ports leading from this passageway to the various bearing surfaces, *i. e.*, the portions forming the crankshaft bearings and the throws or crank pin portions, and thence to connect this passageway at one or a plurality of points to a source of lubricant under pressure, so that lubricant flowing through the passageway will pass out through the ports onto the several bearing surfaces.

This passageway through the crankshaft is made by drilling axial openings through the several alined bearing portions of the crankshaft and through the angularly displaced or off set crank pin portions, and thence drilling radially inward at various parts of the crankshaft to connect the adjacent axial portions of the passageway. It is then necessary to plug or otherwise close the ends of the axial openings and the outer ends of the radially disposed connecting openings. The forming of this irregular passageway through the crankshaft requires considerable time, and is quite expensive. Furthermore, while very many different expedients have been proposed or tried out for closing the ends of the axial openings referred to, none have been satisfactory in all respects.

The main object of the invention is to form the passageway through the crankshaft in such a way that more satisfactory lubrication is obtained, and so that the finished crankshaft is less expensive and easier to make than heretofore.

My invention may be briefly summarized as consisting in certain novel details of construction and combinations and arrangements of features which will be described in the specification and set forth in the appended claims.

In the accompanying sheet of drawings, Figure 1 is a side view of a portion of a 6-cylinder crankshaft embodying my invention, the middle portion of the crankshaft being removed; Fig. 2 is an enlarged view of a portion of the crankshaft with parts in section; and Fig. 3 is a section substantially along the line 3—3 of Fig. 2.

Referring now to the drawings, 10 represents the crankshaft as a whole. This crankshaft is provided at its ends with bearing portions 11 and between its ends with axial alined bearing portions 12 and with throws or crank pin portions 13, the number of the throws or crank pin portions 13 depending upon the number of cylinders of the engine for which the crankshaft is designed, and the number of bearing portions 12 depending on the construction of the engine. The offset crank pin portions 13 are connected to the adjacent bearing portions 11 and 12 by arms 14, which are generally radially disposed, as shown in the drawing. As in the prior constructions, axial openings are drilled through the various axially disposed portions 11, 12 and 13 of the crankshaft, these axial openings being designated at 16.

One of the improvements of the present invention consists in the disposition of the openings which connect the adjacent axial openings 16. Instead of connecting adjacent openings 16 by drilling from outside points in a direction parallel with the surfaces or sides of the arms 14, *i. e.*, (radially in the event the arms 14 are radial), and thence plugging the outer ends of these connecting openings, I provide diagonal connecting openings 17 by inserting the point of the drill diagonally into the end of one of each pair of the axial openings 16. and thence drilling inwardly or outwardly as the case may be, on a line diagonally disposed with reference to the sides of the corresponding arm 14 into which the drilling is being done, so that said opening at its inner end is adjacent the end of one axial opening 16 and at its outer end is adjacent the end of the adjoining axial opening 16. In other words, the opening is drilled simply from one axial opening 16 to the next, and no part of this connecting opening need be plugged or otherwise closed.

Then, as another feature of my invention, instead of using the entire opening 16 as an oil passageway, and in some more or less difficult and unsatisfactory manner closing the end of each axial opening 26, as has been done heretofore, I insert in each axial opening whether the same be in one of the bearing portions or in one of the crank pin portions a tube 18, which is of slightly less diameter than the diameter of the opening 16, and then fasten the tube into place, and at the same time securely close the ends of the annular space between the tube and the wall of opening 16, preferably by expanding or spinning outwardly the ends of the tube.

In each of the several bearing portions 12 and crank pin portions 13, the tube extends from one end of the passageway 16 to the other, and the ends of the tube are spun outwardly and are tightly fitted into slightly countersunk portions at the ends of the opening 16, as shown at 18ᵃ. In the two end bearings, the tube preferably does not extend throughout the length of the opening 16, and while the inner ends of the tubes in these portions are spun outwardly into the countersunk openings, as shown at 18ᵃ, the outer ends of the tube are preferably spun and tightly fitted into recesses or over internal shoulders, as shown at 18ᵇ at points between the ends of the bearing portions 11.

By this expedient there is formed in each of the several axial alined and off set portions of the crank shaft a shallow annular passageway 19, the middle portion of the opening 16, i. e. the portion within the tube 18 being entirely open from end to end. While as here shown the tube is fastened in place and at the same time the ends of the annular space 19 are closed by expanding the ends of the tube, it will be obvious that other means of accomplishing this result may be resorted to, such as by soldering, brazing, or by means of screws or other fastening devices. Lubricant will pass outwardly from each of these annular passageways 19 on to the adjacent bearing surfaces through the usual outlet ports 19ᵃ, except at those points where the lubricant is supplied to the crankshaft passageway. Of course, where the lubricant is supplied by pipe connections to the crankshaft passageway, usually at the end bearings and at one or more of the intermediate bearings 12, the lubricant will pass inwardly through the ports 19ᵃ.

This provides a construction which is far less troublesome from a manufacturing standpoint than those which have been used heretofore. Additionally, the crankshaft when in use has advantages which I believe are not possessed by the crankshafts constructed by any of the former methods. In the first place, there is considerably less lubricant carried by the crankshaft than is the case if the entire openings which are drilled into the axially disposed portions are filled with lubricant. Futhermore, inasmuch as there is between each of the tubes and the surrounding wall in effect a rather thin film of lubricant instead of a more or less solid body of lubricant, in the event that there is any defect or injury which causes the lubricant to flow entirely out of any particular portion of the crankshaft leaving that portion empty, there is in my improved construction a far less unbalancing of the crankshaft than would be the case if that particular portion of the crankshaft were relieved of a greater weight of lubricant. At the same time, and in spite of the fact that the lubricant is in the form of a film in the several axial portions of the crankshaft, a sufficient amount of lubricant will flow through the passageway as a whole, and of course through the component parts thereof to afford ample lubrication.

Having thus described my invention, what I claim is:—

1. A crankshaft having an axial portion with an outer bearing surface, said portion having an inner opening, a member of less diameter than said opening inserted in the latter, forming between said member and the wall of said opening an annular lubricating passageway, and means for conducting lubricant to and from said annular passageway.

2. A crankshaft having an axial portion provided with an outer bearing surface, and having an inner passageway extending therethrough, a member of less diameter than said passageway in the latter, the ends of said member extending outwardly and closing the annular passageway between said member and the wall of the passageway, said crankshaft having inlet and outlet openings connected to said annular passageway.

3. A crankshaft having an axial portion provided with an outer bearing surface, and with an inner opening, a tubular member which is of less diameter than the opening fitted in said opening and spaced therefrom except at its ends which extend outwardly so as to close the ends of the annular passageway between said member and the wall of the opening, and a port extending between said annular passageway and said bearing surface.

4. A crankshaft having an axial portion provided with an outer bearing surface and having an opening extending therethrough, a tubular member of less diameter than said opening fitted in the latter, said member having its ends bent outwardly and secured to said axial portion of the crankshaft at the ends of the opening therein, and a port extending between said annular passageway and said bearing surface.

5. A crankshaft having a plurality of axially extending offset portions, each having an outer bearing surface, and each having an inner opening containing a tube of less diameter than the opening forming an annular passageway between the tube and the wall of the opening, said crankshaft having passageways connecting the several annular passageways so as to form a continuous lubricating conduit.

6. A crankshaft having a plurality of axially disposed bearing and crank pin portions, each provided with an inner axial opening, a tubular member in the opening, said member being of less diameter than the opening and having means to form an annular passageway closed at its ends, said crankshaft having openings connecting the several annular passageways and ports leading from the latter on the bearing surfaces.

7. A crankshaft having a bearing portion, a crankpin portion and an arm connecting the bearing and crankpin portions, a lubricating passageway extending through the bearing portion, the arm and the crankpin portion of the crankshaft, the portion of the passageway in the arm extending diagonally therethrough and making acute angles with the portions of the passageway in the bearing and crankpin portions of the crankshaft, the extended axis of said portion of the passageway through the arm intersecting the inner face of the arm opposite the portion of the passageway in the bearing portion of the crankshaft.

8. A crankshaft having a bearing portion, a crank pin portion and an arm connecting said portions, a lubricating passageway extending through the arm and the bearing and crank pin portions of the crankshaft, the portion of the passageway in the arm extending diagonally therethrough and making acute angles with the portions of the passageway in the bearing and crank pin portions of the crankshaft, the extended axis of said portion of the passageway in the arm intersecting the outer face of the arm opposite the portion of the passageway in the crank pin portion of the crankshaft.

9. A crankshaft having a bearing portion, a crankpin portion and an arm connecting said portions, axial lubricating passageways extending through the bearing and crankpin portions, a diagonal passageway extending through the arm and connecting the two axial passageways, the axis of said diagonal passageway if extended, intersecting the inner face of the arm opposite the bearing portion, and intersecting the outer face of the arm opposite the crankpin portion whereby the passageway may be drilled through the arm by a tool inserted through one of the side faces of the arm.

10. A crankshaft having a pair of alined portions, a pair of arms extending outwardly therefrom and a crankpin portion at the outer ends of said arms, a lubricating passageway extending through said alined portions, arms and crankpin portion of the crankshaft, the portions of the passageway extending through the arms being diagonally disposed with reference thereto and diverging outwardly so that the outer ends of said diagonal portions of the lubricating passageway are farther apart than the inner ends, the extended axes of said portions of the passageway through the arm intersecting the inner side faces of the arms opposite the alined portions and the outer side faces of the arms opposite the crankpin portion.

In testimony whereof I hereunto affix my signature in the presence of two witnesses.

GEORGE W. HARPER.

Witnesses:
L. I. PORTER,
A. F. KWIS.